(12) United States Patent
Cornett et al.

(10) Patent No.: US 9,421,559 B2
(45) Date of Patent: Aug. 23, 2016

(54) AIR DRIVEN DISPENSER FOR DELIVERY OF UNDILUTED CHEMICAL

(71) Applicant: Hydra-Flex, Inc., Burnsville, MN (US)

(72) Inventors: Zachary Cornett, Lakeville, MN (US); John Tyler Greffin, Hawthorn Woods, IL (US)

(73) Assignee: Hydra-Flex, Inc., Burnsville, MN (US)

( * ) Notice: Subject to any disclaimer, the term of this patent is extended or adjusted under 35 U.S.C. 154(b) by 0 days.

(21) Appl. No.: 14/176,978

(22) Filed: Feb. 10, 2014

(65) Prior Publication Data

US 2014/0224895 A1 Aug. 14, 2014

Related U.S. Application Data

(60) Provisional application No. 61/762,937, filed on Feb. 10, 2013.

(51) Int. Cl.
| | |
|---|---|
| *B05B 7/30* | (2006.01) |
| *B05B 1/20* | (2006.01) |
| *B05B 1/26* | (2006.01) |
| *B05B 7/04* | (2006.01) |
| *B60S 3/04* | (2006.01) |

(52) U.S. Cl.
CPC ............... *B05B 1/202* (2013.01); *B05B 1/267* (2013.01); *B05B 7/0416* (2013.01); *B60S 3/04* (2013.01)

(58) Field of Classification Search
CPC .. B05B 7/2486; B05B 7/2489; B05B 7/2491; B05B 7/26; B05B 7/262; B05B 7/265; B05B 7/28; B05B 7/30; B05B 1/14; B05B 1/20; B05B 1/202; B05B 1/26; B05B 1/262; B05B 1/267; B05B 7/02; B05B 7/04; B05B 7/0416; B60S 3/00; B60S 3/04

USPC .............................................. 239/8, 159, 340
See application file for complete search history.

(56) References Cited

U.S. PATENT DOCUMENTS

| | | | | |
|---|---|---|---|---|
| 2,549,406 | A | * | 4/1951 | Anderson ..................... 239/135 |
| 3,307,744 | A | | 3/1967 | Burford |
| 3,614,137 | A | | 10/1971 | Jacobson |
| 3,788,344 | A | | 1/1974 | Dyck |
| 3,825,030 | A | | 7/1974 | Kalsi |
| 3,825,187 | A | * | 7/1974 | Tatge ........................ B05B 7/30 239/312 |

(Continued)

FOREIGN PATENT DOCUMENTS

JP 2004000878 A 1/2004

OTHER PUBLICATIONS

Zurn QickPort® Manifold Brochure, 2007, 2 pages.

*Primary Examiner* — Christopher Kim
(74) *Attorney, Agent, or Firm* — Dorsey & Whitney LLP

(57) ABSTRACT

A chemical delivery system that delivers concentrated liquid chemical using a non-liquid motive fluid to deliver the concentrated liquid chemical in an undiluted form to a point of use. The concentrated chemical is delivered by the motive fluid by way of the aggressive interaction of a high-pressure jet stream of motive fluid causing a nearly complete local vacuum such that the concentrated chemical is drawn under low pressure into a jet vortex to form a chemical dispersion. Forming the chemical dispersion by way of this venturi eduction process occurs in a substantially continuous real-time manner allowing for multiple methods of controlling the total amount of chemical delivered and the rate in which it is delivered to the application device.

19 Claims, 8 Drawing Sheets

(56) References Cited

U.S. PATENT DOCUMENTS

| | | | |
|---|---|---|---|
| 4,067,665 A | 1/1978 | Schwartzman | |
| 4,146,059 A | 3/1979 | Heilmann | |
| 4,209,343 A * | 6/1980 | Lane | A47L 15/4236 |
| | | | 134/102.2 |
| 4,508,272 A | 4/1985 | Thompson | |
| 4,691,850 A | 9/1987 | Kirschmann et al. | |
| 4,781,467 A | 11/1988 | Williams | |
| 4,848,391 A | 7/1989 | Miller et al. | |
| 4,988,077 A | 1/1991 | Conley et al. | |
| 5,033,489 A | 7/1991 | Ferre et al. | |
| 5,050,631 A | 9/1991 | Konno et al. | |
| 5,219,422 A | 6/1993 | Sato | |
| 5,419,347 A | 5/1995 | Carruth | |
| 5,435,157 A | 7/1995 | Laughlin | |
| 5,439,020 A | 8/1995 | Lockhart | |
| D368,298 S | 3/1996 | Miller et al. | |
| 5,522,419 A | 6/1996 | Sand | |
| 5,607,651 A | 3/1997 | Thomas et al. | |
| 5,622,203 A | 4/1997 | Givler et al. | |
| 5,927,337 A | 7/1999 | LaMantia | |
| 6,113,007 A | 9/2000 | Bagnara et al. | |
| 6,240,953 B1 | 6/2001 | Laughlin et al. | |
| 6,267,303 B1 * | 7/2001 | Francis | B05B 7/30 |
| | | | 137/893 |
| 6,322,242 B1 | 11/2001 | Lang et al. | |
| RE37,617 E | 4/2002 | Sherman | |
| 6,571,824 B2 | 6/2003 | Jones et al. | |
| 6,619,318 B2 | 9/2003 | Dalhart et al. | |
| 6,718,216 B2 | 4/2004 | Grier | |
| 6,733,044 B2 | 5/2004 | Huang | |
| 6,755,207 B1 | 6/2004 | Curtis et al. | |
| 6,852,264 B2 | 2/2005 | Ouellette | |
| 7,111,644 B2 | 9/2006 | Rehder et al. | |
| 7,201,290 B2 | 4/2007 | Mehus et al. | |
| 8,322,367 B2 | 12/2012 | Harris et al. | |
| 9,089,865 B2 * | 7/2015 | Bullock | A61M 11/02 |
| 2003/0127534 A1 | 7/2003 | Firestone | |
| 2006/0157131 A1 | 7/2006 | Harris et al. | |
| 2007/0119217 A1 | 5/2007 | Worthington | |
| 2007/0252020 A1 * | 11/2007 | Smeraldi | A01M 7/0014 |
| | | | 239/354 |
| 2008/0046278 A1 | 2/2008 | Sanville et al. | |
| 2009/0090415 A1 | 4/2009 | Harris et al. | |
| 2009/0139545 A1 | 6/2009 | Rowlands et al. | |
| 2010/0186778 A1 | 7/2010 | Martin | |
| 2011/0067738 A1 | 3/2011 | Molitor et al. | |
| 2011/0192433 A1 | 8/2011 | Harris et al. | |
| 2012/0080134 A1 | 4/2012 | Harris et al. | |
| 2012/0325853 A1 | 12/2012 | Harris et al. | |
| 2013/0160865 A1 | 6/2013 | Harris et al. | |
| 2013/0200102 A1 | 8/2013 | Harris et al. | |
| 2014/0042242 A1 | 2/2014 | Fritze et al. | |

* cited by examiner

US 9,421,559 B2

AIR DRIVEN DISPENSER FOR DELIVERY OF UNDILUTED CHEMICAL

PRIORITY CLAIM

The present application claims priority to U.S. Provisional Application Ser. No. 61/762,937 filed Feb. 10, 2013 and entitled, "QUICK-DISCONNECT KEYED AIR DRIVEN VENTURI NOZZLE", which is hereby incorporated by reference in its entirety.

FIELD OF THE INVENTION

The present disclosure relates to the field of chemical dispensing. More particularly, the present disclosure is directed to a chemical delivery system that delivers concentrated liquid chemical using a non-liquid motive fluid to deliver the concentrated liquid chemical in an undiluted form to a point of use.

BACKGROUND OF THE INVENTION

Currently in the vehicle care industry when it is desired to deliver an undiluted chemical from a storage tank to an area for a particular use, a positive displacement pump such as, for example, an air driven peristaltic pump is used with one or more spray nozzles plumbed to the outlet. These pumps are low cost and serve the function well at high flow rates and long run times but when conditions involve low flow rates, short run times, and/or high accuracy of chemical delivery, these pumps fall short. Often times you will see chemical running out of a nozzle directly onto the floor, thus not being directed or atomized by the spray nozzle at all resulting in wasted chemical and poor performance of the system.

SUMMARY OF THE INVENTION

In addressing and overcoming the problems presented by current pumps and their related methods of application for condition involving short run times, low flow rates and/or high accuracy of chemical delivery, the present invention utilizes a venturi style injector with the use of air as a motive fluid that can be used to deliver a chemical undiluted to the point of use. The present invention allows a low volume of chemical to be delivered in a high velocity dispersion thru one or more spray nozzles to a desired application surface. Furthermore, a method of the present invention allows for the use of manufacturing techniques like injection molding and/or extruding to be used, thereby reducing the cost to manufacture and also allowing for the integration of many features into one part i.e. a quick connect injector and spray nozzle. Chemical delivery systems of the present invention can be especially valuable when dispersing non-soluble chemicals. In car wash and vehicle care applications, the chemical delivery system can be especially valuable in dispensing silicon based tire cleaning and shine materials, wax-based chemicals, drying agents, deicing agents and fragrances.

In one aspect the present invention is directed to a chemical delivery system that delivers concentrated liquid chemical using a non-liquid motive fluid to deliver the concentrated liquid chemical in an undiluted form to a point of use. In this type of chemical dispensing system, the concentrated chemical is delivered by the motive fluid by way of the aggressive interaction of a high-pressure jet stream of motive fluid causing a nearly complete local vacuum such that the chemical is drawn under low pressure into the jet vortex. The interaction of the low-pressure concentrate and the high pressure vortex in a conventional chemical delivery system typically causes the chemical and a liquid motive fluid to mix rapidly into a uniformly diluted solution but in this method the specific selection of proper non-liquid motive fluid and concentrated chemical allows the delivery of undiluted concentrate chemical. This venturi eduction process occurs in a substantially continuous real-time manner allowing for multiple methods of controlling the total amount of chemical delivered and the rate in which it is delivered to the application device.

In another aspect, the present disclosure is directed to a chemical delivery system for delivery of a concentrated liquid chemical to a point of use. The chemical delivery system can comprise a motive fluid source having a non-liquid motive fluid such as, for example, compressed air or appropriate gases, a chemical source having an amount of a concentrated liquid chemical and at least one venturi injector. The at least one venturi injector can have a motive fluid inlet fluidly connected to the motive fluid source, a concentrated chemical inlet fluidly connected to the chemical source and a dispensing outlet fluidly connected to a point of use. Introduction of the non-liquid motive fluid within the at least one venturi injector can induce a vacuum condition within a mixing region of the venturi injector wherein the concentrated liquid chemical is drawn into the venturi injector and mixed with the non-liquid motive fluid to form a chemical dispersion for dispensing at the point of use. Dispensing of the chemical dispersion at the point of use can result in a sudden loss of velocity of the chemical dispersion causing the concentrated chemical to separate from the non-liquid motive fluid and be applied in an undiluted concentration. The chemical delivery system can further comprise a manifold having a plurality of venturi injectors. In some embodiments, the manifold can comprise a dual channel manifold having a motive fluid channel and a concentrated chemical channel. In some embodiments, the dual channel manifold can comprise a quick-connected feature for attaching each venturi injector for quick connecting the motive fluid channel to the motive fluid inlet and the concentrated chemical channel to the concentrated chemical inlet.

In still another aspect, the present disclosure is directed to a method of delivering an undiluted chemical to a point of use. The method can comprise supplying a non-liquid motive fluid to at least one venturi injector to create an area of low pressure or vacuum within a mixing region of the venturi injector. The method can further comprise educting a concentrated chemical into the at least one venturi injector in response to the vacuum condition, wherein the concentrated chemical is mixed into the non-liquid motive fluid to form a chemical dispersion. The method can further comprise directing the undiluted chemical dispersion from the at least one venturi injector to a point of use. At the point of use, the chemical dispersion can experience a rapid decrease in velocity whereby the concentrated chemical separates from the non-liquid motive fluid such that the concentrated chemical is applied in an undiluted amount. In some embodiments, the method further comprises providing a plurality of venturi injectors that are individually attachable to a manifold. The method can further comprise providing a dual channel manifold having a motive fluid channel and a concentrated chemical channel wherein attachment of each venturi injector to the manifold includes fluid connection of the motive fluid inlet to the motive fluid channel and fluid connection of the concentrated chemical inlet to the concentrated chemical channel.

The present disclosure further relates to chemical dispensing in the vehicle care or car wash industry. In particular, the delivery of undiluted chemicals for the purpose of giving tires a glossy appearance as well as potential applications in other areas where the delivery and application of an undiluted chemical would be desired such as, for example, the application of scents, vehicle drying, or de-icing.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be more completely understood in consideration of the following detailed description of various embodiments of the invention in connection with the accompanying drawings, in which.

Figure 1:
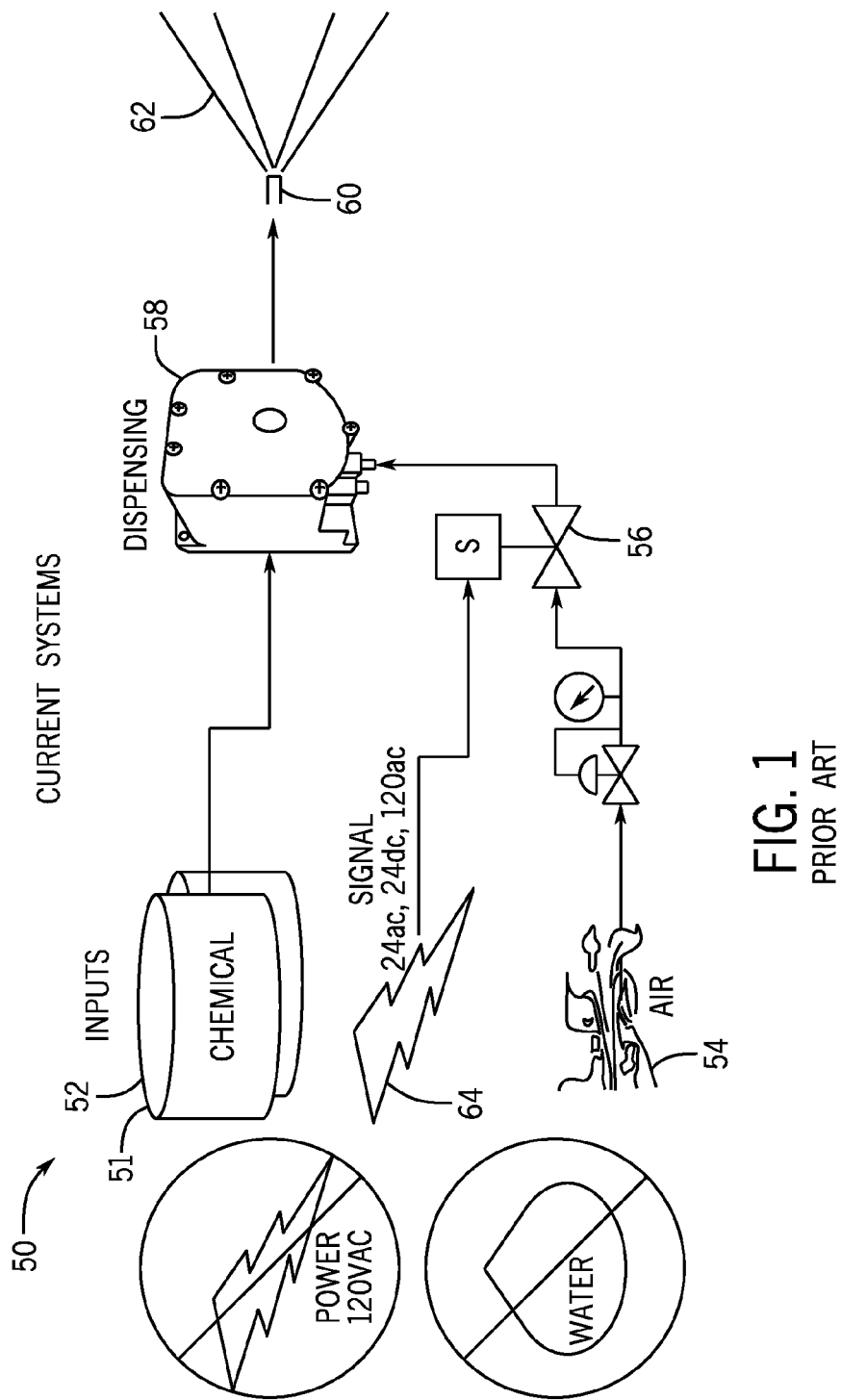
FIG. 1 is a schematic illustration of a conventional chemical dispensing system of the prior art utilizing a positive displacement pump.

While the invention is amenable to various modifications and alternative forms, specifics thereof have been shown by way of example in the drawings and will be described in detail. It should be understood, however, that the intention is not to limit the invention to the particular embodiments as described. On the contrary, the intention is to cover all modifications, equivalents, and alternatives falling within the spirit and scope of the invention as defined by the appended claims.

DETAILED DESCRIPTION OF THE FIGURES

Referring now to FIG. 1, a representative dispensing system 50 for an undiluted chemical 51 of the prior art is illustrated. Generally, dispensing system comprises a chemical source 52, a pressurized gas source 54, typically compressed air, a control valve 56 such as, for example, a solenoid valve, a diaphragm pump 58 and a dispensing element 60, such as, for example a nozzle or wand at a point of use 62. In operation, a control signal 64 is supplied to the control valve 56 when dispensing of the undiluted chemical 51 is required at the dispensing element 60. Control signal 64 can comprise a manual signal, such as, for example, by a button or trigger or an automatic signal generated by a proximity sensor, pressure switch, photo eye or the like. Control signal 64 generally directs the control valve 56 to open wherein regulated air flow from the pressurized gas source 54 flows to diaphragm pump 56, wherein undiluted chemical 51 is pumped from the chemical source 52 to the dispensing element 60. With the dispensing system 50, the response time of the diaphragm pump 58 combined with the viscosity of the undiluted chemical 51 typically results in a significant response lag and slow buildup of pressure at the dispensing element 60.

Figure 2:
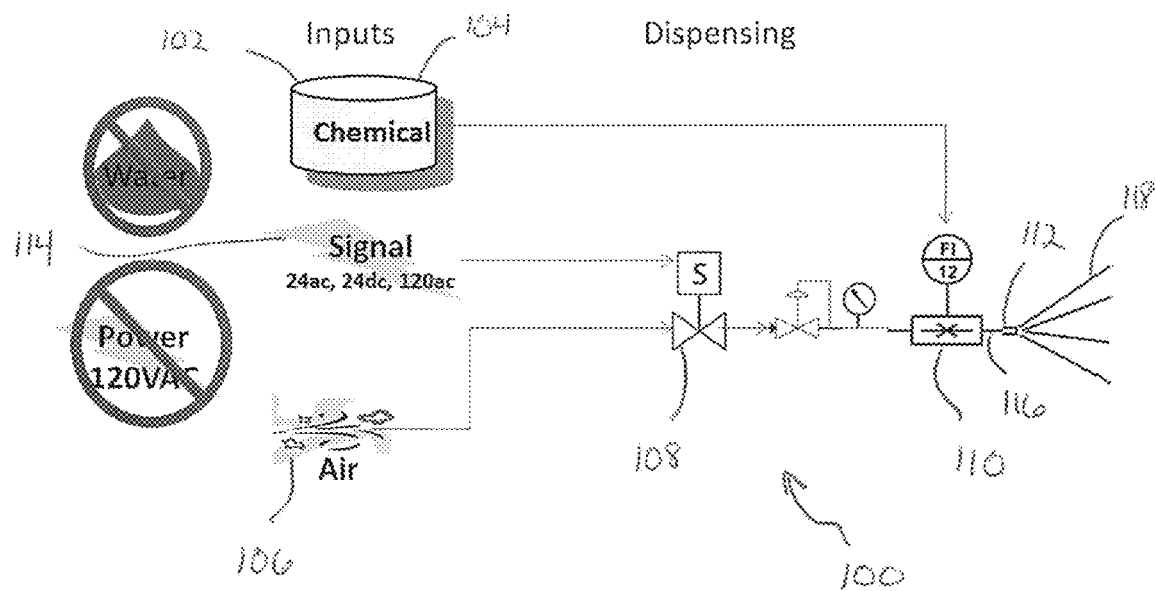
FIG. 2 is a schematic illustration of a chemical dispensing system utilizing an air driven venturi nozzle according to a representative embodiment of the present invention.

A chemical dispensing system 100 according to an embodiment of the present invention is illustrated generally in FIG. 2. Chemical dispensing system 100 generally comprises a chemical source 102 having an undiluted chemical 104, a pressurized gas source 106, typically compressed air, a control valve 108, a venturi injector 110 and a dispensing element 112. Venturi injector 110 can comprise a representative injector such as, for example, a venturi injector as disclosed in U.S. Patent Publications 2006/0157131A1 and 2012/0080134A1, the disclosures of which are herein incorporated by reference in their entirety and which are commercially available from Hydra-Flex, Inc. of Burnsville, Minn.

In operation, a control signal 114 is supplied to the control valve 108 when dispensing of the undiluted chemical 104 is requested at the dispensing element 112. Control signal 114 can comprise a manual signal, such as, for example, by a button or trigger or an automatic signal generated by a proximity sensor, pressure switch, photo eye or the like. Control signal 114 generally directs the control valve 108 to open wherein regulated air flow from the pressurized gas source 106 flows to the venturi injector 110. With the venturi injector 110, the regulated air flow creates a vacuum condition wherein the undiluted chemical 104 is drawn into the air flow to create a chemical dispersion 116. The chemical dispersion 116 is then applied at a point of use 118 using the dispensing element 112. As the chemical dispersion 116 exits the dispensing element 112, the velocity of the chemical dispersion 116 decreases to the point where the air flow and undiluted chemical 104 separate to their original states, thus no longer a dispersion, and allowing for the delivery of the undiluted chemical 104 to a desired surface at the point of use 118. Chemical dispensing system 100 is especially suited for use as part of an automated car wash or vehicle care system.

Figure 3:
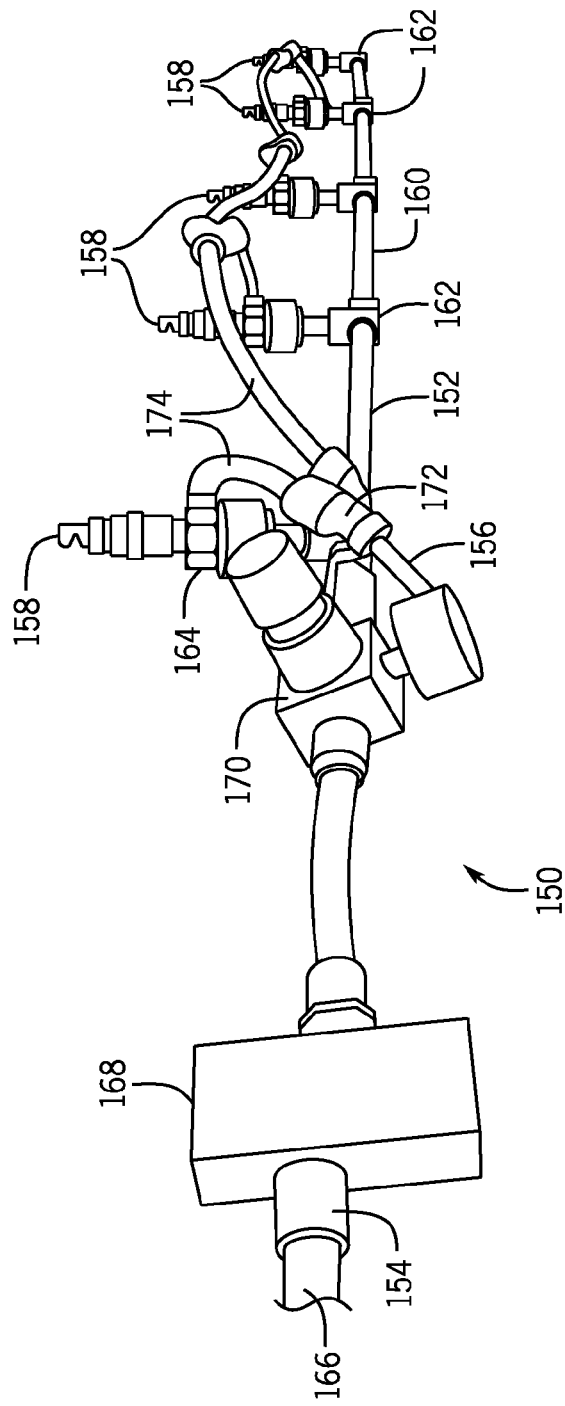
FIG. 3 is a perspective view of a chemical dispensing system according to a representative embodiment of the present invention.
Figure 4:
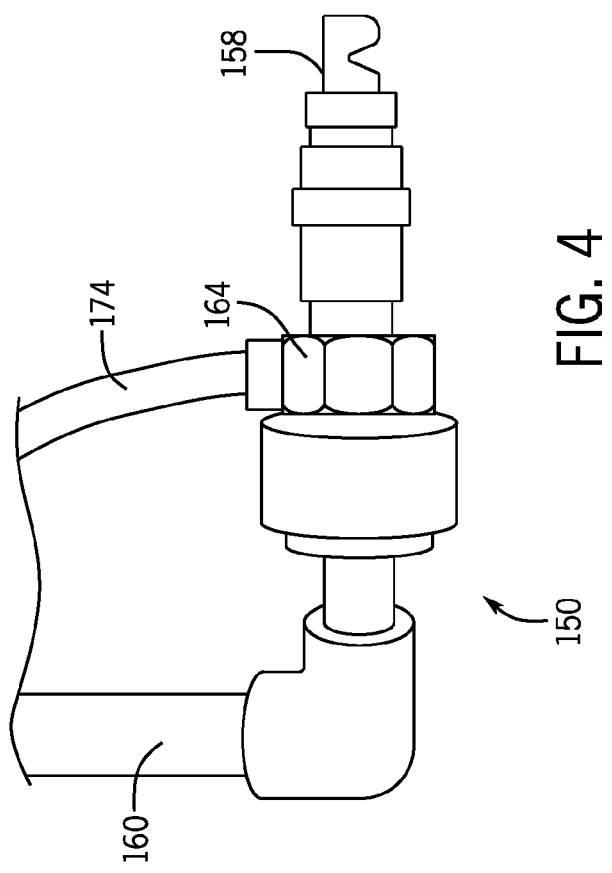
FIG. 4 is a side view of the chemical dispensing system of FIG. 3.
Figure 5:
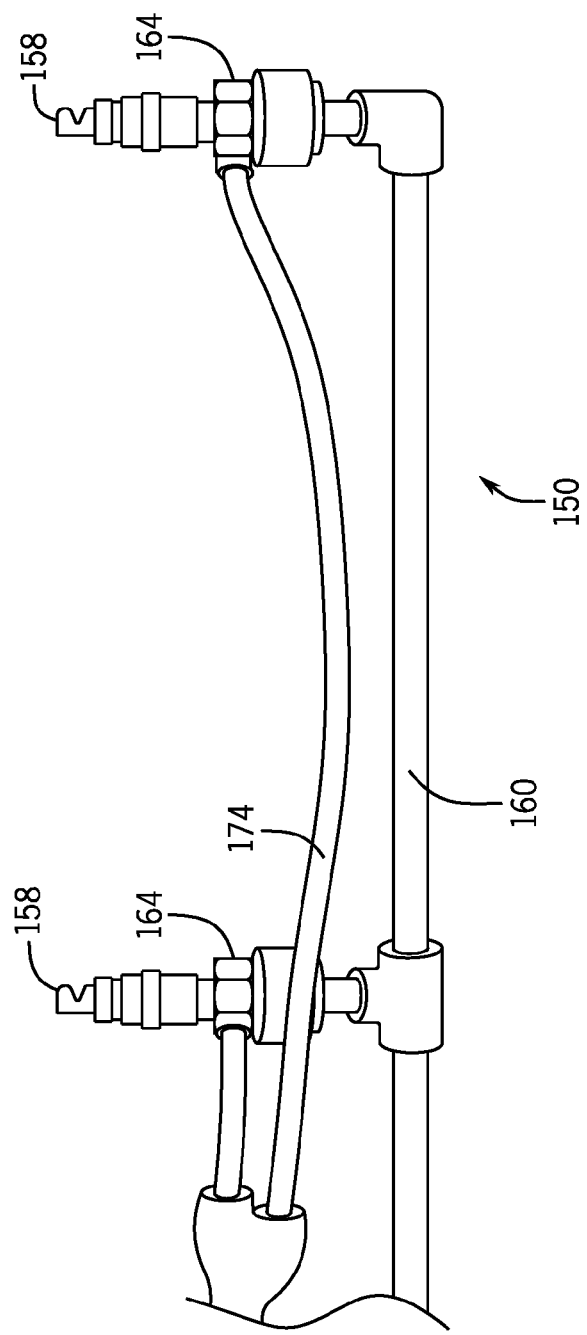
FIG. 5 is a side view of the chemical dispensing system of FIG. 3.

A representative embodiment of a chemical dispensing system 100 is illustrated as chemical dispensing system 150 in FIGS. 3, 4 and 5. Chemical dispensing system 150 generally comprises a multiport manifold 152 having a non-liquid motive fluid inlet 154, a concentrated chemical inlet 156 and a plurality of chemical dispersion outlets 158. The multiport manifold 152 can further comprise a non-liquid motive fluid channel 160 including a plurality of injector ports 162. Each injector port 162 can individually and selectively accommodate a venturi injector 164, preferably via a quick-connect attachment of the venturi injector 164 to the injector port 162. At the non-liquid motive fluid inlet 154, the chemical dispensing system 150 can further comprise a non-liquid motive fluid source 166 such as, for example, compressed air, a motive fluid control valve 168 and a motive fluid pressure regulator 170. At the concentrated chemical inlet 156, the chemical dispensing system 150 can further comprise a chemical supply manifold 172 having individual chemical supply lines 174 corresponding to the number of venturi injectors 164. Each chemical supply line 174 can be individually attached to the desired and corresponding venturi injector 164, preferably through the use of a quick-connect feature or connection.

Generally, the non-liquid motive fluid source 166, typically compressed air, is supplied to the motive fluid control valve 168. When the motive fluid control valve 168 receives a signal from a point of use, for example, a manual signal from a switch, button or trigger or an automatic signal from a pressure switch, photo eye, proximity sensor or the like, the motive fluid control valve 168 opens to allow the compressed air to enter the motive fluid pressure regulator 170. The motive fluid pressure regulator 170 allows the pressure of the non-liquid motive fluid source 166 to be reduced such that the compressed air is delivered to the multiport manifold 152 and consequently each venturi injector 164 at consistent pressure to optimize performance of the venturi injectors 164 and to maintain consistent performance of the chemical dispensing system 150. The now regulated compressed air enters the multiport manifold and flows through the non-liquid motive fluid channel 160. The regulated compressed air is delivered to each venturi injector 164 through the corresponding injector port 162. As the regulated compressed air flows through each venturi injector 164, a low pressure region or vacuum is created within each venturi injector that causes a concentrated chemical to be drawn through the concentrated chemical inlet 156, into the chemical supply manifold 172, through the individual chemical supply lines 174 and into the corresponding venturi injector 164 to form a chemical dispersion. The chemical dispersion is directed to points of use through the chemical dispersion outlets 158. At the point of use, the chemical dispersion can be directed at a desired location or surface wherein the decrease in velocity resulting from dispensing of the chemical dispersion causes separation of the concentrated chemical and the compressed air such that the concentrated chemical is delivered in an undiluted state.

Figure 6:
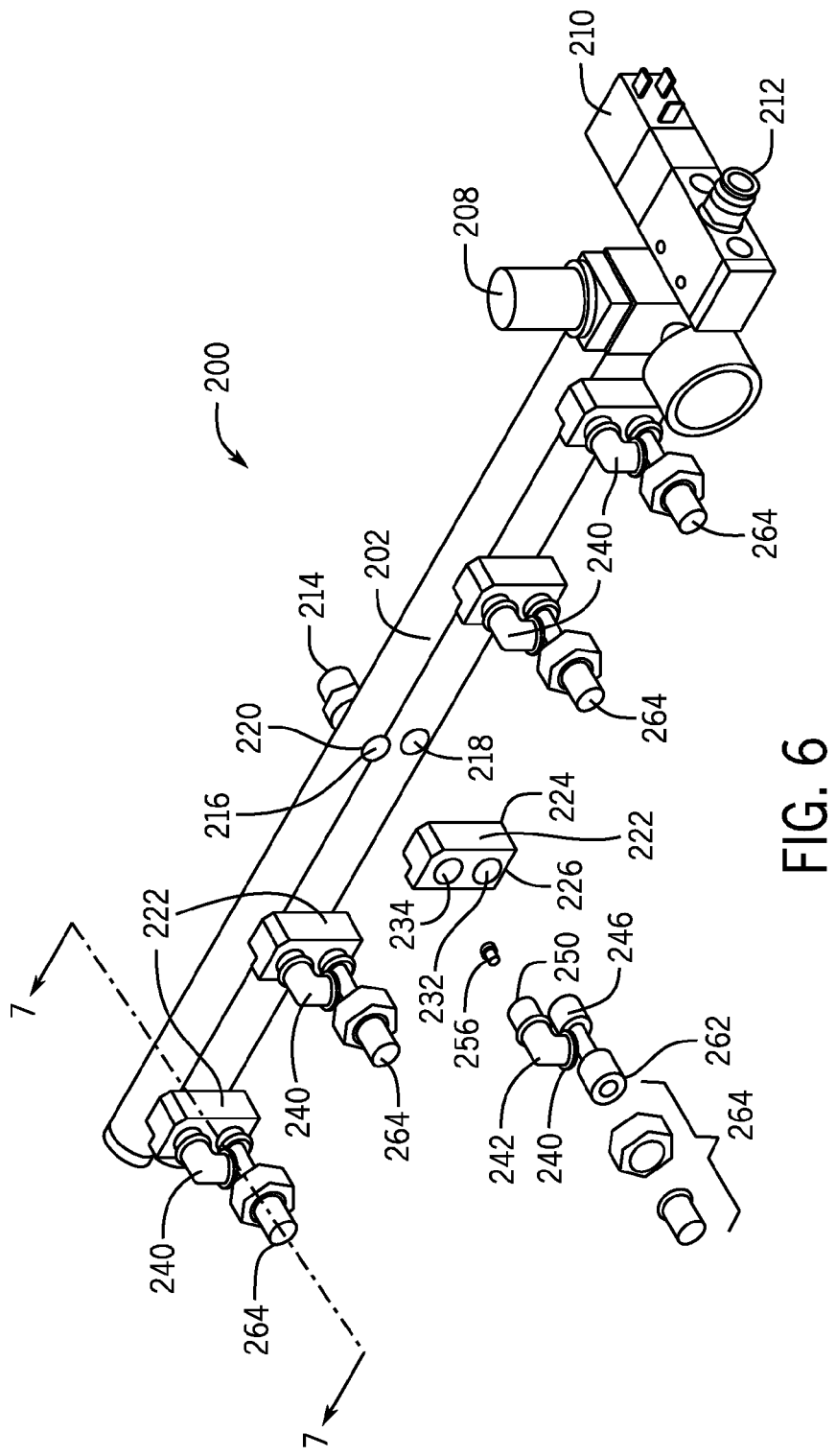
FIG. 6 is a partially, exploded, perspective view of a chemical dispensing system according to a representative embodiment of the present invention.
Figure 7:
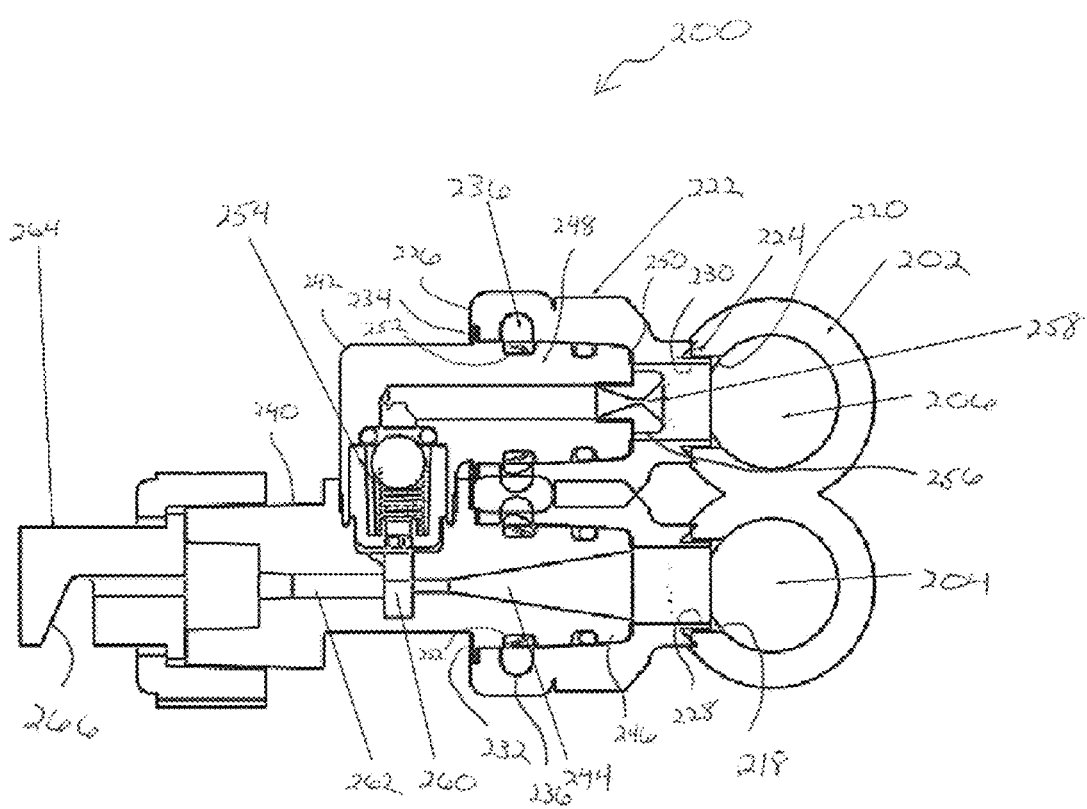
FIG. 7 is a section view of the chemical dispensing system of FIG. 6 taken at line 7-7 of FIG. 6.

Referring now to the FIGS. 6 and 7, another representative embodiment of a chemical dispensing system 200 of the present invention can make use of a dual channel manifold 202. Chemical dispensing system 200 can function in a similar manner as previously described with respect to chemical dispensing system 150 with the incorporation of a non-liquid motive fluid channel 204 and a concentrated chemical channel 206 into the dual channel manifold 202. The use of dual channel manifold 202 simplifies installation and operation of the chemical dispensing system by eliminating and/or reducing the number of connections and allowing for quick repair or replacement of components.

As seen in FIGS. 6 and 7, the non-liquid motive fluid channel 204 is fluidly coupled to a pressure regulator 208 and a motive fluid control valve 210 having a non-liquid motive fluid inlet 212. The concentrated chemical channel 206 is fluidly coupled to concentrated chemical inlet 214. At a plurality of locations along dual channel manifold 202, a coupling location 216 is defined that includes a motive fluid port 218 and a concentrated chemical port 220, with each port 218, 220 being fluid connected to the corresponding non-liquid motive fluid channel 204 or concentrated chemical channel 206.

At each coupling location 216, a connector block 222 is fluidly coupled to the dual channel manifold 202. Each connector block 222 includes a manifold side 224 and an injector side 226. The manifold side 224 includes a block motive fluid connector 228 for attaching to the motive fluid port 218 and a block concentrated chemical fluid connector 230 for attaching to the concentrated chemical port 220. The injector side 226 includes a block motive fluid port 232 and a block concentrated chemical fluid port 234. Each block motive fluid port 232 and block concentrated chemical fluid port 234 can include a releasable quick connect feature 236.

Figure 9:
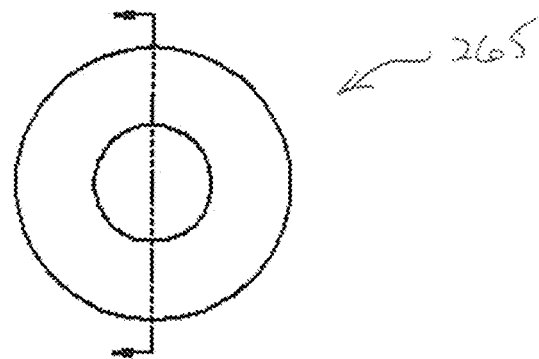
FIG. 9 is an end view of the venturi nozzle of FIG. 8.
Figure 8:
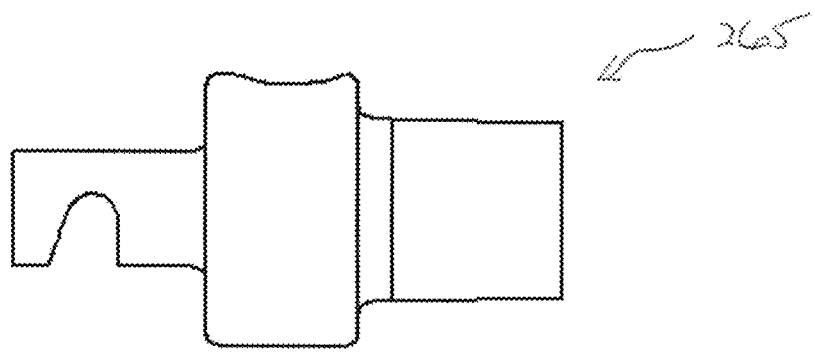
FIG. 8 is a side view of a venturi nozzle according to a representative embodiment of the invention.
Figure 10:
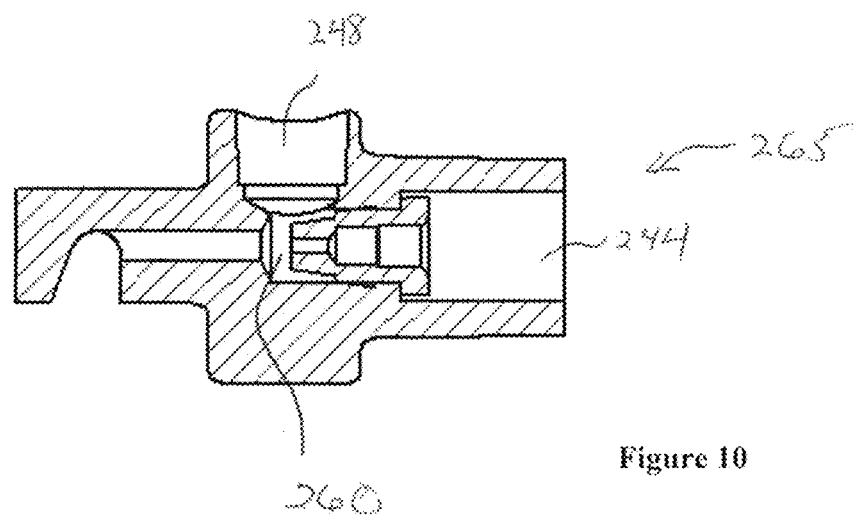
FIG. 10 is a section view of the venturi nozzle of FIG. 8 taken at line 10-10 of FIG. 9.

Attached to the injector side 226 of each connector block 222 is a venturi injector 240. Venturi injector 240 includes an injector body 242 defining a motive fluid flowpath 244 having a venturi motive fluid connection 246 and a concentrated chemical flowpath 248 having a venturi concentrated chemical connection 250. The injector body 242 can include an external groove 252 on one or both of the venturi motive fluid connection 246 and venturi concentrated chemical connection 246 to connect, retain and selectively detach the injector body 242 from the releasable quick connect feature 236. The concentrated chemical flow path 248 can further include a spring operated check valve 254 and a metering tip 256 defining a metering orifice 258. Within the injector body a mixing region 260 is defined at the intersection of the motive fluid flowpath 244 and the concentrated chemical flowpath 248. The injector body 242 further comprises an injector outlet 262 that can attach to a nozzle 264. In order to further simplify the assembly of chemical dispensing assembly 200, venturi injector 240 and nozzle 264 can be integrated and fabricated to comprise a venturi nozzle 265 as shown in FIGS. 8, 9 and 10 that eliminates the need to separately attach the nozzle 264 to the injector outlet 262.

In use, pressurized air is supplied to the to the non-liquid motive fluid inlet 212, whereby the motive fluid control valve 210 selectively opens and closes to allow the pressurized air to enter the pressure regulator 208 such that the pressurized air at a desired pressure is supplied to the non-liquid motive fluid channel 204. At the same time, a source of concentrated chemical is attached to the concentrated chemical inlet 214 to supply the concentrated chemical channel 206. The pressurized air flows through the block motive fluid connector 228, out the block motive fluid port 232 and into the venturi motive fluid connect 246. The pressurized air flows through the motive fluid flowpath 244 and into the mixing region 260 wherein an area of low pressure or vacuum is created. The vacuum condition causes the spring operated check valve 254 to be biased to an open position wherein the concentrated chemical is drawn from the concentrated chemical channel 206, into the block concentrated chemical fluid connector 230, through the block concentrated chemical fluid port 234, through the metering tip 256 and into the concentrated chemical flowpath 248. The concentrated chemical is drawn into the mixing region 260 wherein a concentrated chemical dispersion is formed. The concentrated chemical dispersion exits the injector outlet 262 and can be administered at a point of use through nozzle 264. In some instances, nozzle 264 can comprise a fan or deflected fan nozzle having a deflection surface 266 for controlling a dispersion pattern when applied to a surface. As the concentrated chemical dispersion is dispensed though the nozzle 264, the velocity of the chemical dispersion decreases such that the dispersion separates and the concentrated chemical is dispersed in an undiluted fashion at the point of use.

Chemical dispensing system 200 provides a number of operational advantages. First, the use of dual-channel manifold 202 reduces both the number of plumbing connections and tubing runs. Secondly, the connector block 222 allows for the removal and adjustment/replacement of venturi injectors 240 by simply releasing the releasable quick connect feature 236. By regulating the pressure of the non-liquid motive fluid supplied to each motive fluid flowpath 244, a user can selectively vary and adjust the amount of concentrated chemical drawn into the mixing region by replacing the metering tip with a second metering tip having a second metering orifice.

The various embodiments of chemical delivery systems of the present disclosure are especially valuable in car wash or vehicle care operations that utilize non-soluble chemicals. For example, silicone based tire shine or cleaning chemicals are generally insoluble in water and as such, can provide poor performance such as, for example, spotty coverage when dispersed in an aqueous stream. Other chemicals that are suited for application using the chemical delivery systems of the present disclosure can include wax-based products, drying agents, deicing agents or fragrances.

Although specific examples have been illustrated and described herein, it will be appreciated by those of ordinary skill in the art that the present application is intended to cover adaptations or variations thereof of the presently disclosed invention. Therefore, it will be understood that the scope of the present invention is defined by the attached claims and their legal equivalents.

The invention claimed is:

1. A chemical delivery system, comprising:
    a motive fluid source having a non-liquid motive fluid;
    a chemical source having an amount of a concentrated liquid chemical;
    a plurality of venturi injectors, each venturi injector having a motive fluid inlet fluidly connected to the motive fluid source, a concentrated chemical inlet comprising a check valve, the concentrated chemical inlet fluidly connected to the chemical source, and a dispensing outlet fluidly connected to a point of use, the non-liquid motive fluid inducing a vacuum condition within a mixing region of the venturi injector where the check valve opens in response to the vacuum condition and the concentrated liquid chemical is drawn into the mixing region and mixed with the non-liquid motive fluid to form an undiluted chemical dispersion for dispensing from the dispensing outlet; and
    a manifold defining a chemical supply flow pathway therein fluidly connecting the chemical source to the concentrated chemical inlet for each of the venturi injectors; and
    a plurality of connector blocks fluidly connected to the chemical supply flow pathway and selectively securable to the manifold, wherein each of the plurality of connector blocks is fluidly coupled to one venturi injector of the plurality of venturi injectors and selectively couples the one venturi injector to the manifold, wherein each of the plurality of connector blocks comprises:
        a motive fluid connector fluidly coupled to the motive fluid inlet; and
        a chemical fluid connector fluidly coupled to the concentrated chemical inlet.

2. The chemical delivery system of claim 1, wherein the concentrated liquid chemical comprises a non-water soluble liquid chemical.

3. The chemical delivery system of claim 1, wherein the non-liquid motive fluid comprises compressed air.

4. The chemical delivery system of claim 1, further comprising a non-liquid motive fluid channel fluidly connecting the motive fluid source with the motive fluid inlet.

5. The chemical delivery system of claim 4, further comprising a motive fluid control valve and a pressure regulator between the motive fluid source and the non-liquid motive fluid channel.

6. The chemical delivery system of claim 4, wherein the non-liquid motive fluid channel and the chemical flow pathway are both defined by the manifold, wherein the channels extend through the manifold.

7. The chemical delivery system of claim 6, wherein the manifold includes a plurality of coupling locations, each coupling location having a motive fluid port and a concentrated chemical port, each coupling location accepting attachment to one of the plurality of venturi injectors.

8. The chemical delivery system of claim 7, wherein each connector block comprises a releasable quick-connect feature for attaching the venturi injector.

9. The chemical delivery system of claim 8, wherein each venturi injector includes a metering tip within the concentrated chemical inlet, the metering tip having a metering orifice for metering the amount of concentrated chemical drawn into the venturi injector.

10. The chemical delivery system of claim 9, wherein the metering tip can be replaced with a second metering tip having a second metering orifice for adjusting the amount of concentrated liquid chemical drawn into the venturi injector.

11. The chemical delivery system of claim 7, further comprising a nozzle being fluidly coupled to each dispensing outlet, wherein a velocity of the chemical dispersion is reduced so as to separate the concentrated liquid chemical and the non-liquid motive fluid such that no dilution of the concentrated liquid chemical occurs during application at point of use.

12. The chemical delivery system of claim 6, wherein the motive fluid channel and the chemical supply flow pathway are defined solely by the manifold.

13. The chemical delivery system of claim 1, further comprising a motive flow path fluidly connected to the motive fluid source and the motive fluid inlet of each of the venturi injectors, wherein the non-motive fluid and the concentrated chemical flow in substantially parallel paths between each of the venturi injectors in the motive flow path and chemical supply flow pathway, respectively.

14. The chemical delivery system of claim 1, wherein the motive fluid connector is aligned with the chemical fluid connector.

15. A method for dispensing an undiluted liquid chemical at a point of use, comprising:
    supplying through a motive fluid inlet, a non-liquid motive fluid to a plurality of venturi injectors, each venturi injector having a check valve, the non-liquid motive fluid creating a vacuum condition within a mixing region of the at least one venturi injector;
    drawing a concentrated chemical from a common chemical inlet through a manifold defining a chemical supply flow pathway directing the chemical towards a plurality of connector blocks fluidly connected to the chemical supply flow pathway, wherein the plurality of connector blocks are selectively securable to the manifold and each connector block is fluidly coupled to one venturi injector of the plurality of venturi injectors and selectively couples the one venturi injector to the manifold, wherein each of the plurality of connector blocks comprises:
        a motive fluid connector fluidly coupled to motive fluid inlet; and
        a chemical fluid connector fluidly coupled to the common chemical inlet;
    wherein each of the connector blocks directs the non-liquid motive fluid and the chemical fluid into corresponding mixing regions of each of the plurality of venturi injectors via the check valve under the influence of the vacuum condition, wherein by the concentrated chemical is mixed into the non-liquid motive fluid to form a chemical dispersion; and
    dispensing the chemical dispersion at a point of use with a reduced velocity to promote separation of the non-liquid motive fluid and the concentrated chemical such that the concentrated chemical is delivered to the point of use at an undiluted concentration.

16. The method of claim 15,
    wherein, the manifold is a dual channel manifold defining a motive fluid channel for the non-liquid motive fluid and the chemical supply flow pathway, wherein the dual channel manifold includes a plurality of coupling locations, wherein each coupling location includes a motive fluid port and a concentrated chemical port for fluidly coupling one venturi injector to each coupling location; and each of the connector blocks couples to the dual channel manifold at the coupling location such that the motive fluid connector is fluidly coupled to the motive fluid port and the chemical fluid connector is fluidly coupled to the concentrated chemical port.

17. The method of claim 16, further comprising:
regulating a pressure of the non-liquid motive fluid such that the pressure of the non-liquid motive fluid is the same at each motive fluid port.

18. The method of claim 17, further comprising:
metering an amount of concentrated chemical drawn into each venturi injector with a metering tip having a metering orifice, the metering tip positioned in a concentrated chemical flowpath of each venturi injector.

19. The method of claim 18, further comprising:
adjusting the amount of concentrated chemical drawn into each venturi injector by replacing the metering tip with a second metering tip having a second metering orifice.

\* \* \* \* \*